US012008076B2

United States Patent
Liu et al.

(10) Patent No.: US 12,008,076 B2
(45) Date of Patent: Jun. 11, 2024

(54) END-TO-END ATTENTION POOLING-BASED CLASSIFICATION METHOD FOR HISTOPATHOLOGY IMAGES

(71) Applicant: Wuhan University, Wuhan (CN)

(72) Inventors: Juan Liu, Wuhan (CN); Zhiqun Zuo, Wuhan (CN); Yuqi Chen, Wuhan (CN); Zhuoyu Li, Wuhan (CN); Jing Feng, Wuhan (CN)

(73) Assignee: Wuhan University, Wuhan (CN)

( * ) Notice: Subject to any disclaimer, the term of this patent is extended or adjusted under 35 U.S.C. 154(b) by 372 days.

(21) Appl. No.: 17/546,965

(22) Filed: Dec. 9, 2021

(65) Prior Publication Data

US 2022/0188573 A1 Jun. 16, 2022

(30) Foreign Application Priority Data

Dec. 10, 2020 (CN) .......................... 202011454778.1

(51) Int. Cl.
*G06F 18/214* (2023.01)
*G06F 18/241* (2023.01)
(Continued)

(52) U.S. Cl.
CPC ........ *G06F 18/2148* (2023.01); *G06F 18/241* (2023.01); *G06N 20/00* (2019.01);
(Continued)

(58) Field of Classification Search
CPC ... G06F 18/2148; G06F 18/241; G06N 20/00; G06N 3/045; G06N 3/048; G06N 3/08;
(Continued)

(56) References Cited

U.S. PATENT DOCUMENTS

2020/0258218 A1\* 8/2020 Xu ........................... G06N 3/08
2021/0390338 A1\* 12/2021 Xu ........................ G06F 18/217

OTHER PUBLICATIONS

Tellez, et al., "Neural Image Compression for Gigapixel Histopathology Image Analysis", IEEE Transactions on Patter Analysis and Machine Intelligence, vol. 43, No. 2, Feb. 2021, pp. 567-578.

(Continued)

*Primary Examiner* — Juan A Torres
(74) *Attorney, Agent, or Firm* — JAQUEZ LAND GREENHAUS & MCFARLAND LLP; Bruce W. Greenhaus, Esq.

(57) ABSTRACT

Provided is an end-to-end attention pooling-based classification method for histopathological images obtaining a better classification effect for small number of samples by S1, cutting the histopathology image into patches of a specified size, removing the patches with too much background area and packaging the remaining patches into a bag; S2, training a deep learning network by taking the bag obtained in S1 as an input using a standard multi-instance learning method; S3, scoring all the patches by using the trained deep learning network, and selecting m patches with highest and lowest scores for each whole slide image to form a new bag; S4, building a deep learning network including an attention pooling module, and training the network by using the new bag obtained in S3; and S5, after the histopathology image to be classified is processed in S1 and S3, performing classification by using the model obtained in S4.

9 Claims, 6 Drawing Sheets

(51) Int. Cl.
  *G06N 20/00* (2019.01)
  *G06T 7/00* (2017.01)
  *G06T 7/194* (2017.01)
(52) U.S. Cl.
  CPC ............ *G06T 7/0012* (2013.01); *G06T 7/194* (2017.01); *G06T 2207/20081* (2013.01); *G06T 2207/20084* (2013.01); *G06T 2207/30068* (2013.01)
(58) Field of Classification Search
  CPC .................. G06T 7/0012; G06T 7/194; G06T 2207/20081; G06T 2207/20084; G06T 2207/30068; G06T 2207/10056; G06V 10/267; G06V 10/82; G06V 20/695; G06V 20/698
  USPC ........................................................ 382/128
  See application file for complete search history.

(56) References Cited

OTHER PUBLICATIONS

Ilse, et a;., "Attention-based Deep Multiple Instance Learning", Proceedings of the 35th International Conference on Mchine Learning, Stockholm, Swede, PMLR 80, 2018, 10 pgs.

Zhao, et al., "Exploring Self-attention for Image Recognition", Computer Vision Foundation, 2020, pp. 10076-10085.

Zhao, et al., "A Hierarchical Attention Recommender System Based on Cross-Domain Social Networks", Hindawi Complexity, vol. 2020, Article ID 9071624, 13 pgs.

Cheuk, et al., "Revisiting the Onsets and Frames Model with Additive Attention", 2021 International Conference on Neural/ Networks, 8 pgs.

* cited by examiner

END-TO-END ATTENTION POOLING-BASED CLASSIFICATION METHOD FOR HISTOPATHOLOGY IMAGES

TECHNICAL FIELD

The present disclosure relates to the field of automatic diagnosis of histopathology images, in particular to an automatic classification method for histopathological whole slide images, and belongs to the use of a deep learning model in the field of medical image analysis.

BACKGROUND ART

According to statistics from the World Health Organization, the incidence of cancer is still growing rapidly in the past few years, especially in low-income or middle-income countries, where the incidence and mortality of cancer are rising. In contrast, the number of deaths caused by some types of cancer in developed countries has begun to decline, which is inseparable from the breakthrough in early diagnosis technology. However, in the low-income or middle-income countries, there is a serious shortage of resources required for diagnosis, and many patients are already at an advanced stage when they are diagnosed, and there is no effective treatment method. Results obtained from histopathology images have long been used as a gold standard for cancer diagnosis, but this process requires experienced pathologists to spend quite a long time to complete. Therefore, developing a computer-aided diagnosis system is of great significance for reducing the burden on the medical system and helping patients in poor areas.

With the development of the digital scanning technology, the histopathology images can be digitally stored and displayed, which makes it possible for the development of computer automatic processing technology. Compared with natural images, pathology images have unique characteristics. Firstly, the natural images (such as images in ImageNet dataset) usually contain $10^4$-$10^6$ pixels, while the histopathology images (such as images in CAMELYON16 dataset) contain more than $10^{12}$ pixels and occupy more than 1 GB of storage space. Secondly, there are relatively few samples of the pathology images. Since the histopathology images need to be obtained from the patients, it is much more difficult to collect than natural data. For some rare diseases, only dozens to hundreds of samples may be collected. Finally, the labeling of the pathology images is more difficult. The labeling of the pathology images can only be done by experts, and the labeling process takes a long time and is prone to errors, so there are relatively rare available labeling samples. In particular, pixel-level fine labeling cannot be obtained on a large scale at all.

In the previous work, researchers often manually design features for images, for example, segmenting cell nuclei in the image, then extracting its tissue texture and morphological features, and finally using traditional machine learning methods such as k-means clustering and support vector machine for classification. In recent years, with the development of the deep learning technology, the convolutional neural network (CNN) has shown great value in the field of classification of the natural images. However, when the deep learning technology is used to classify the histopathology images, the huge size of the pathology images makes it impossible to directly apply CNN to the entire image. However, due to the lack of pixel-level fine labeling, when the pathology image is segmented into smaller patches, the labels of these patches cannot be known. In addition, the training of CNN requires a lot of labeled data, and a dataset of the histopathology images is usually difficult to provide enough data for its training.

SUMMARY

In view of the above problem in the background art that it is hard to directly use deep learning in classification of histopathology images, the present disclosure firstly scores patches, and selects a subset of the patches by using the scores to realize an end-to-end attention pooling-based network, which automatically classify the histopathological whole slide images. The method can directly classify the whole slide images, reduce the burden on doctors, and enable early diagnosis of cancer in areas with insufficient medical resources.

Training is performed according to pre-prepared training samples of the histopathological whole slide images to form an automatic classification model for the histopathological whole slide images, and the histopathology images to be classified are classified by using the automatic classification model for the histopathology images. The present disclosure is specifically implemented in the following steps:

S1, cutting a histopathological whole slide image into square patches with a side length L, pre-processing to filter patches, and packaging the remaining patches into a bag;

S2, modifying the last fully connected layer in a pre-trained Resnet50 network, recording the modified model as A, and training the model A by a standard multi-instance learning method;

S3, scoring all the patches by using the trained model A, and selecting m patches with highest and lowest scores for each image to form a new bag;

S4, building a deep learning model B including an attention pooling module, and training the model B by using the new bag obtained in S3; and S5, after a bag containing 2 m patches is obtained by processing the histopathology image to be classified in S1 and S3, classifying the bag by using the model B trained in S4, where the classification result is the final classification result of the image to be classified.

Further, preprocessing to filter patches in S1 may refer to removing the patches with the background area ratio exceeding a certain range, and may be specifically implemented as follows:

firstly, calculating a threshold of the background area and foreground area for a whole slide image at a low resolution by using an Otsu method, where a specific algorithm of the Otsu method may be to find a threshold t to minimize a sum of variances within the foreground area and the background area, and a calculation formula may be as follows:

$$\sigma^2(t) = w_0(t)\sigma_0^2(t) + w_1(t)\sigma_1^2(t),$$

$\sigma_0^2(t)$ may refer to a variance of a gray value within the background area when t is taken as the threshold, and $\sigma_1^2(t)$ may refer to a variance within the foreground area when t is taken as the threshold; and it may be assumed that when t is taken as the threshold, a gray value of pixels belonging to the background area is recorded as B(i), a gray value of pixels belonging to the foreground area is recorded as F(i), a number of the pixels belonging to the foreground area is recorded as $N_F$, and a number of the pixels belonging to the background area is recorded as $N_B$, and calculation methods of the variances may be as follows:

$$\sigma_0^2(t) = \frac{1}{N_B} \sum \left(B(i) - \frac{1}{N_B} \sum B(i)\right)^2,$$

and $$\sigma_1^2(t) = \frac{1}{N_F} \sum \left(F(i) - \frac{1}{N_F} \sum F(i)\right)^2,$$

and $w_1(t)$ and $w_2(t)$ may be proportions of the foreground area and the background area when t is taken as the threshold; and after an optimal threshold is obtained by using the above algorithm, a proportion of the background area in a whole patch area under the optimal threshold may be calculated, and if the proportion exceeds a certain value, the patch may be discarded.

Further, in S2, an output dimension of the last fully connected layer of the Resnet50 network may be modified to 128, and a fully connected layer with an input dimension of 128 and an output dimension of 2 may be added after the fully connected layer of the last layer.

Further, training the model A by the standard multi-instance learning method in S2 may be as follows: an assumption of multi-instance learning may be that at least one patch in a positive bag is positive, and all patches in a negative bag are negative; before each epoch of training, firstly all the patches may be scored by using the model A, k patches with the highest score in each image may be selected, and the selected patches may be labeled the same as the whole slide image; and all the selected patch-label pairs may constitute a dataset required for training, the model A may be trained, and the above process may be repeated until an accuracy of the model A on a validation set no longer improves.

Further, training the model A until the accuracy of the model A on the validation set no longer improves may be specifically implemented as follows:

for each patch $x_i$ in the image, an output of the model A may be $[o_{i1}, o_{i2}]$, and then $[p_{i1}, p_{i2}]$ may be obtained by using a softmax function, where $$p_{i2} = \frac{e^{o_{i1}}}{e^{o_{i1}} + e^{o_{i2}}},$$

outputs of all the patches may be collected to obtain $[p_{12}, p_{22}, \ldots, p_{l2}]$, l may be a number of the patches, a maximum value may be recorded as $p_i$, and then a predicted value $y_p$ of the image may be:

$$y_p = \begin{cases} 0 & p_i \leq 0.5 \\ 1 & p_i > 0.5 \end{cases},$$

and when the predicted value is 0, it may mean that the image is predicted to be negative, and when the predicted value is 1, it may mean that the image is predicted to be positive; and according to a prediction result, the classification accuracy of the model A may be calculated, and if the accuracy of the model A on the validation set does not improve after a specified number of epoch, training may be stopped and a model with the highest accuracy on the validation set may be saved.

Further, scoring the patches by using the trained model A in S3 may be specifically as follows: for each patch, a two-dimensional output $[o_1, o_2]$ may be obtained for the last fully connected layer of the model A, and the output may be normalized by using a softmax function to obtain $[p_1, p_2]$, where $$p_i = \frac{e^{o_i}}{\sum_{j=1}^{2} e^{o_j}},$$

and then $p_2$ may be recorded as the score of the model A on the patch.

Further, the model B including the attention pooling module in S4 may have a structure specifically as follows: a feature extraction module, followed by a fully connected layer with a tan h activation layer and a fully connected layer with a sigmoid activation layer, and a classification module;

the feature extraction module may be used to extract a feature $h_i$ corresponding to each patch, then the two fully connected layers with different activation layers may be used to calculate attention weights according to the feature, and a specific calculation process may be as follows:

$$a_{ti} = \tan h(w_T h_i)$$

$$a_{si} = \text{sigmoid}(v^T h_i), \text{ and}$$

$$a_i = \frac{e^{a_{ti} \odot a_{si}}}{\sum_{j=1}^{2m} e^{a_{tj} \odot a_{sj}}},$$

w and v may be parameters of the two fully connected layers, j may have no actual meaning, and may be an index used for summation, $a_i$ may be the attention weight of an i-th feature $h_i$, and a weighted sum of the weights and the features may be performed to obtain a feature representation of the image:

$$h = \sum_{i=1}^{2m} a_i h_i,$$

and then the feature may be classified by the classification module composed of two fully connected layers.

Further, the feature extraction module may use a CNN, a basic unit of the CNN may be a bottleneck module, each bottleneck module may be composed of three convolutional layers, three batch regularization layers and a relu activation layer, and a CNN skeleton may be divided into four parts including 3, 4, 6 and 3 bottleneck modules respectively; then a global pooling layer and two fully connected layers may be connected; and an output dimension of the last fully connected layer may be 128.

Further, the model A and the model B may be both trained by using a stochastic gradient descent method and an Adam optimizer, an initial learning rate may be 0.00001, and a weight decay coefficient may be 0.0001; and in a process of training the model A, a value of the batch size may be 32, and in a process of training the model B, a value of the batch size may be 1.

Compared with the prior art, the present disclosure has the following beneficial effects:
1. The present disclosure uses a new classification method, which effectively improves the accuracy of the obtained model in classifying the histopathology images when only a small amount of data can be used for training of the model.
2. The present disclosure realizes an end-to-end attention pooling-based network by scoring the patches in advance. Due to the limitation of computing resources, the previous attention pooling-based method can only use a two-stage model, that is, the feature is pooled after the feature is extracted. The method provided by the present disclosure scores the patches in advance, and after the patches are selected according to the scores, the patches can be directly used as the input of the model. After attention pooling, the classification result can be directly fed back into the feature extraction process through gradient backpropagation. Such an end-to-end effect significantly improves the classification accuracy.
3. The present disclosure used a combined multi instance learning method when selecting the patches required for the attention pooling, that is, not only patches with higher scores are selected, but some patches with lower scores are selected at the same time. In this way, the influence of negative evidence in the image can be taken into account more, which is beneficial to improve the classification performance of the model.

DETAILED DESCRIPTION OF THE EMBODIMENTS

The technical solutions will now be described clearly and completely by taking a breast histopathology image as an example in the embodiments of the present disclosure with reference to appended drawings in the embodiments of the present disclosure. Apparently, the described embodiments are merely a part rather than all of the embodiments of the present disclosure. All other embodiments obtained by a person of ordinary skill in the art on the basis of the embodiments of the present disclosure without creative efforts shall fall within the protection scope of the present disclosure.

Referring to FIG. 1 to FIG. 6, the present disclosure provides the following technical solution: an automatic classification method for histopathological whole slide images includes the following steps.

Figure 1:
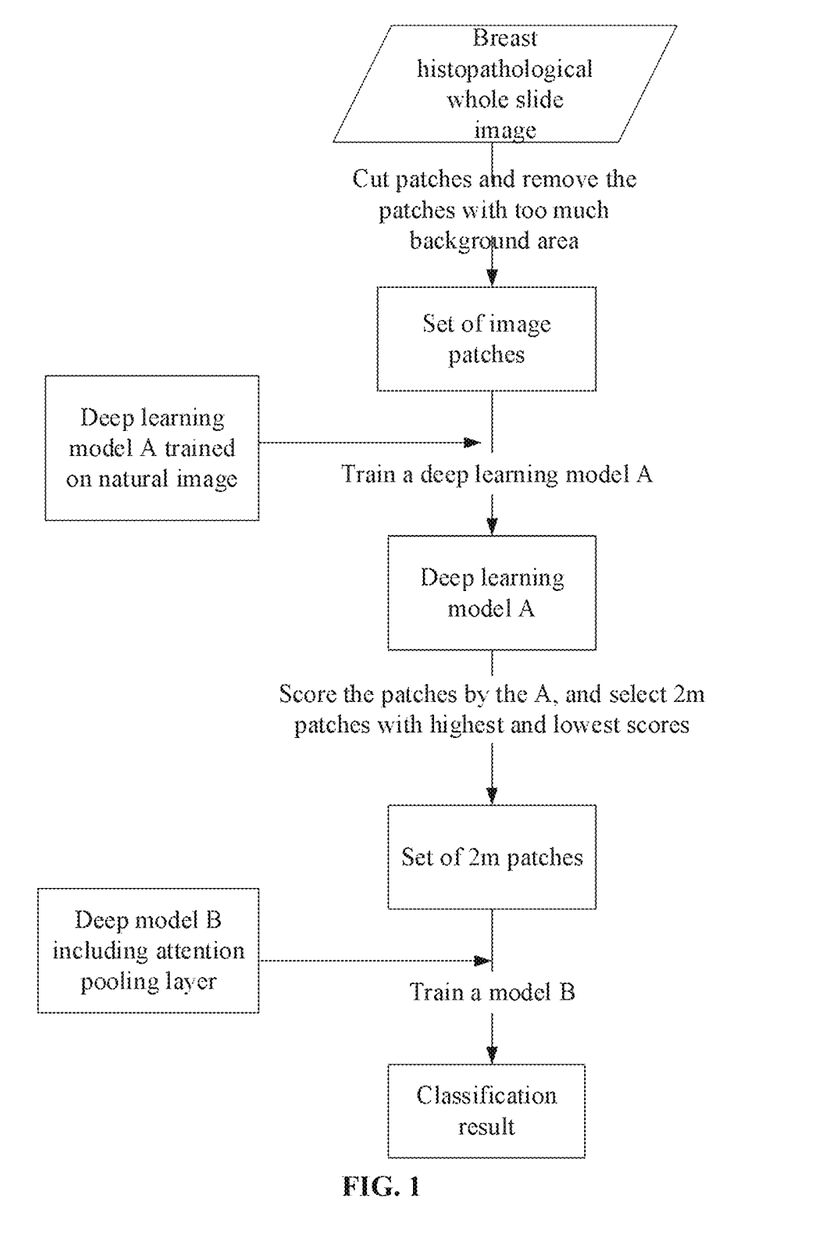
FIG. 1 is a working flowchart of the present disclosure (taking a breast histopathology image as an example)
Figure 2:
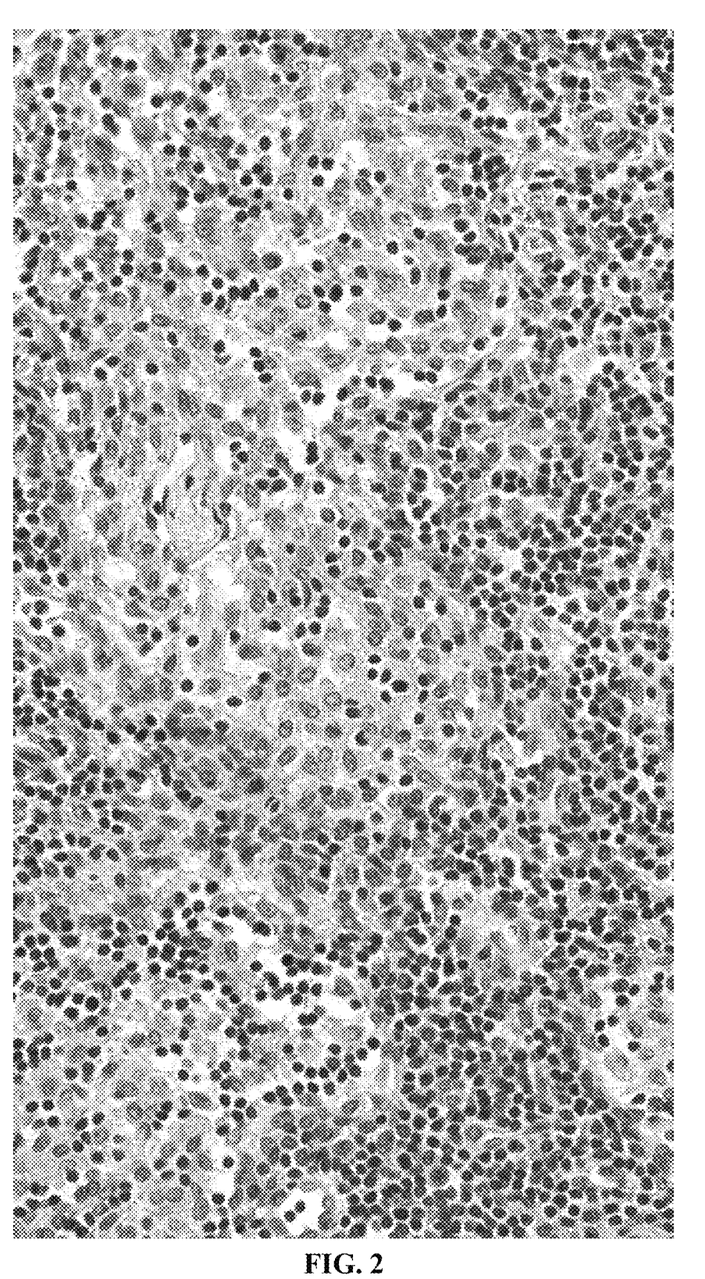
FIG. 2 is a partial area of a histopathological whole slide image used in an experiment of the present disclosure.

S1, A histopathological whole slide image is cut into square patches with a side length L. In the present disclosure, a value of L is 224. The patch with a background area accounting for 50% is removed, and the remaining patches are packaged into a bag.

A method for removing the patches with the background area accounting for 50% is as follows: firstly calculating a threshold of the background area and foreground area for a whole slide image at a low resolution by using an Otsu method. A specific algorithm of the Otsu method is to find a threshold t to minimize a sum of variances within the foreground area and the background area, that is, $$\sigma^2(t) = w_0(t)\sigma_0^2(t) + w_1(t)\sigma_1^2(t).$$

$\sigma_0^2(t)$ refers to a variance of a gray value within the background area when t is taken as the threshold, and $\sigma_1^2(t)$ refers to a variance within the foreground area when t is taken as the threshold. It is assumed that when t is taken as the threshold, a gray value of pixels belonging to the background area is recorded as B(i), a gray value of pixels belonging to the foreground area is recorded as F(i), a number of the pixels belonging to the foreground area is recorded as $N_F$, and a number of the pixels belonging to the background area is recorded as $N_B$, and calculation methods of the variances are as follows:

$$\sigma_0^2(t) = \frac{1}{N_B} \sum \left(B(i) - \frac{1}{N_B}\sum B(i)\right)^2, \text{ and}$$

$$\sigma_1^2(t) = \frac{1}{N_F} \sum \left(F(i) - \frac{1}{N_F}\sum F(i)\right)^2.$$

$w_1(t)$ and $w^2(t)$ are proportions of the foreground area and the background area when t is taken as the threshold. After an optimal threshold is obtained by using the above algorithm, a proportion of the background area in a whole patch area under the optimal threshold is calculated, and if the proportion exceeds a certain value (preferably, in the present disclosure, the value is 50%), the patch is discarded.

S2, The output dimension of the last fully connected layer in a pre-trained Resnet50 network is modified from 1,000 to 128, a fully connected layer with an input dimension of 128 and an output dimension of 2 is added at the end, and the modified model is recorded as A. The model A is trained by a standard multi-instance learning method.

Figure 3:
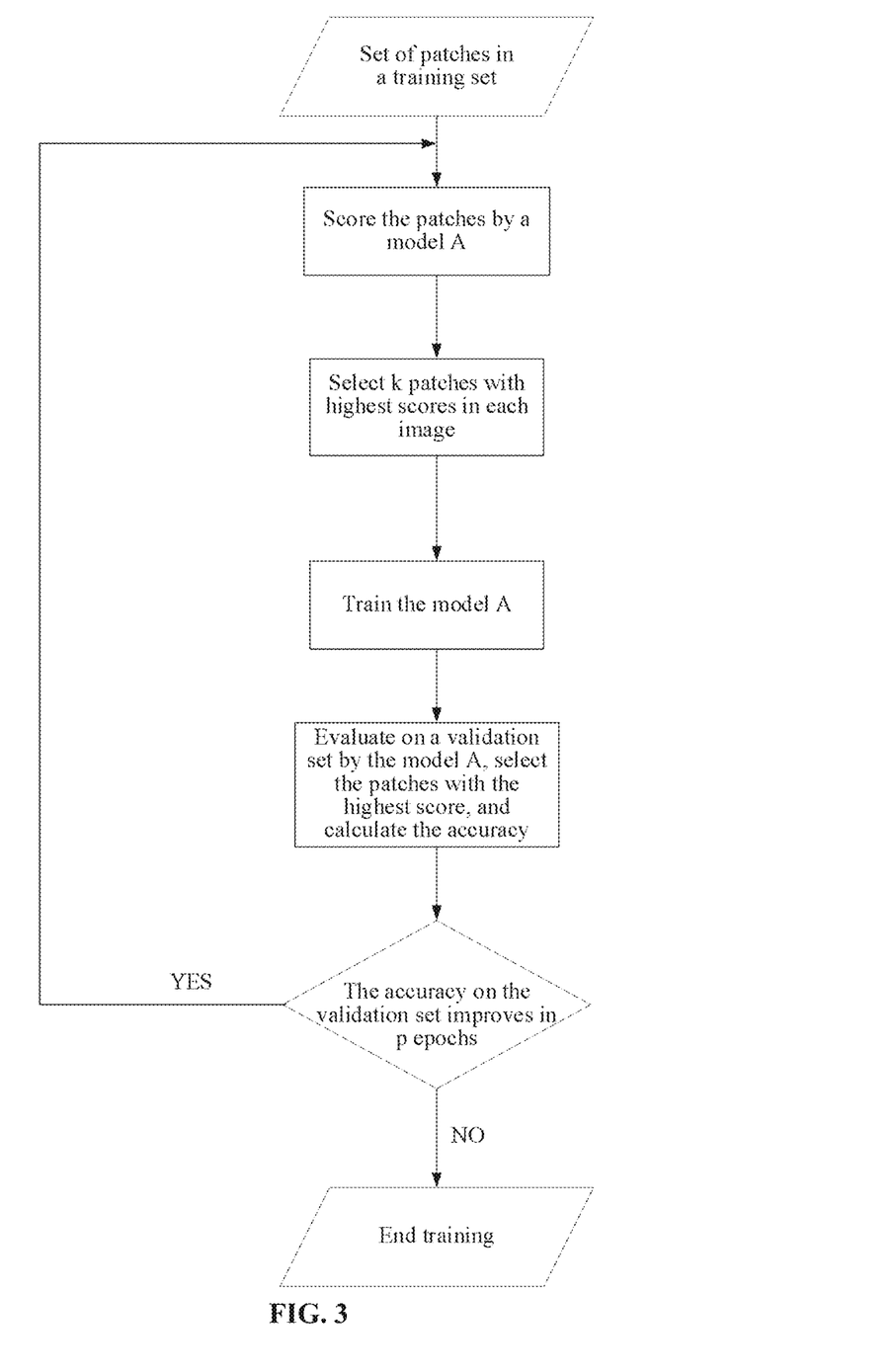
FIG. 3 is a flowchart of training a model A by a standard multi-instance learning method in the present disclosure.

Training the model A by the standard multi-instance learning method is as follows: an assumption of multi-instance learning is that at least one patch in a positive bag is positive, and all patches in a negative bag are negative. Before each epoch of training, firstly all the patches are scored by using the model A, k patches with the highest score in each image are selected, and the selected patches are labeled the same as the whole image. All the selected patch-label pairs constitute a dataset required for training, and the model A is trained. The above process is repeated until an accuracy of the model A on a validation set no longer improves. When the accuracy on the validation set is calculated, a classification result of the patches with the highest score of the model A is taken as a classification result of the whole image of the model A.

Training the model A until the accuracy of the model A on the validation set no longer improves is specifically implemented as follows.

For each patch $x_i$ in the image, an output of the model A is $[o_{i1}, o_{i2}]$, and then $[p_{i1}, p_{i2}]$ is obtained by using a softmax function, where $$p_{i2} = \frac{e^{o_{i1}}}{e^{o_{i1}} + e^{o_{i2}}}.$$

Outputs of all the patches are collected to obtain $[p_{12}, p_{22}, \ldots, p_{l2}]$, l is a number of the patches, a maximum value is recorded as $p_i$, and then a predicted value $y_p$ of the image is:

$$y_P = \begin{cases} 0, & p_i \leq 0.5 \\ 1, & p_i > 0.5 \end{cases}.$$

When the predicted value is 0, it means that the image is predicted to be negative, and when the predicted value is 1, it means that the image is predicted to be positive. According to a prediction result, the classification accuracy of the model A is calculated, and if the accuracy of the model A on the validation set does not improve after a specified number of epoch, training is stopped and a model with the highest accuracy on the validation set is saved.

S3, All the patches are scored by using the trained model A. m patches with highest and lowest scores are selected for each image to form a new bag. Preferably, in the present disclosure, a value of m is 40.

Scoring the patches by using the trained model A is specifically as follows: for each patch, a two-dimensional output $[o_1, o_2]$ is obtained for the last fully connected layer of the model A, and the output is normalized by using a softmax function to obtain $[p_1, p_2]$, where $$p_i = \frac{e^{o_i}}{\sum_{j=1}^{2} e^{o_j}}.$$

Then $p_2$ is recorded as the score of the model A on the patch ($p_1$ is useless in the scoring process, and is directly discarded).

Figure 4:
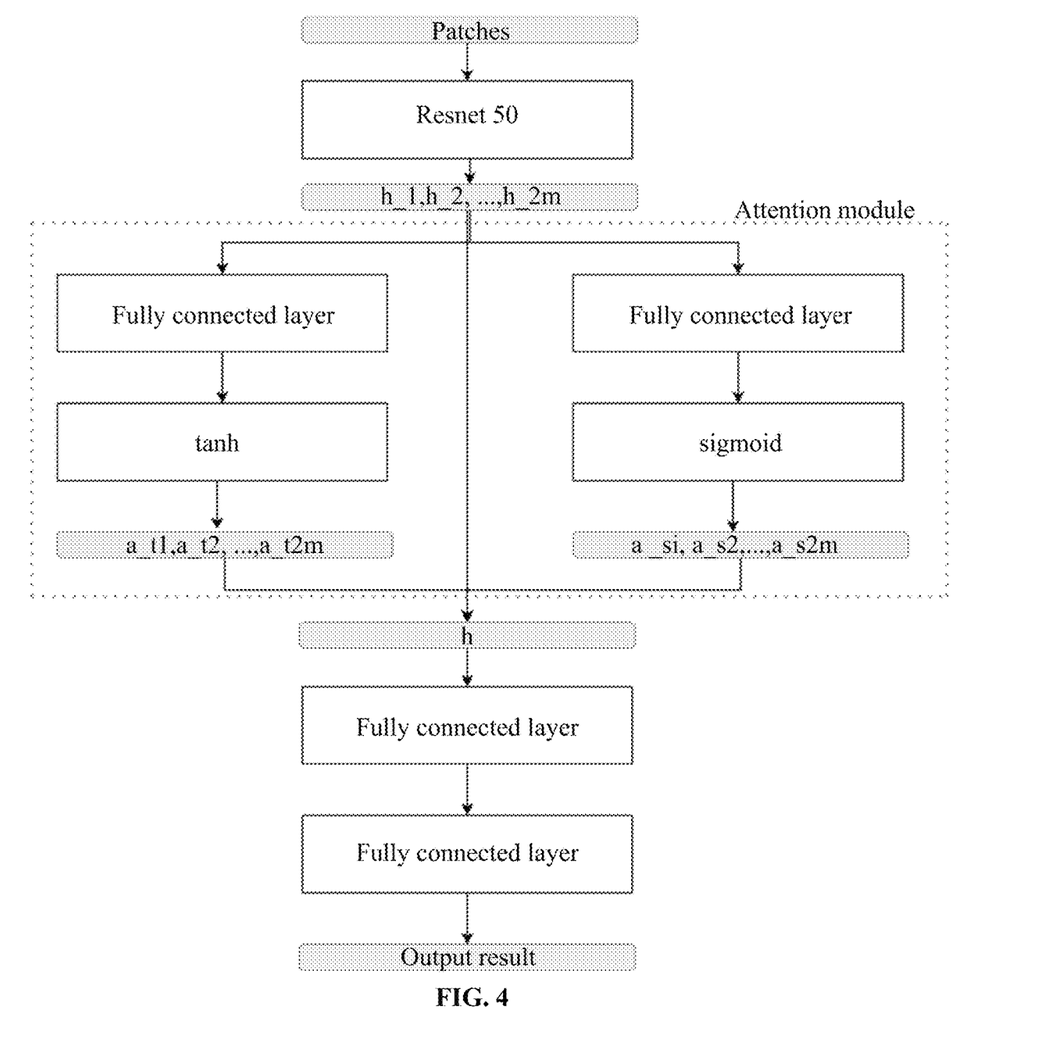
FIG. 4 is a structural diagram of an attention network used in the present disclosure.

S4, A deep learning model B including an attention pooling module is built, and the model B is trained by using the new bag obtained in S3.

The model B including the attention pooling module in S4 has a structure specifically as follows: a feature extraction module, followed by a fully connected layer with a tan h activation layer and a fully connected layer with a sigmoid activation layer, and a classification module.

The deep learning model B including the attention pooling module has a mechanism as follows: firstly the feature extraction module is used to extract a feature $h_i$ corresponding to each patch, and then the two fully connected layers with different activation layers are used to calculate attention weights according to the feature. A specific calculation process is as follows:

$$a_{ti} = \tanh(w^T h_i),$$
$$a_{si} = sigmoid(v^T h_i), \text{ and}$$
$$a_i = \frac{e^{a_{ti} \odot a_{si}}}{\sum_{j=1}^{2m} e^{a_{tj} \odot a_{sj}}}.$$

w and v are parameters of the two fully connected layers, and $a_i$ is the attention weight of an i-th feature $h_i$. A weighted sum of the weights and the features is performed to obtain a feature representation of the image:

$$h = \sum_{i=1}^{2m} a_i h_i.$$

Then the feature is classified by a classifier composed of two fully connected layers.

The feature extraction module uses a CNN, a basic unit of the CNN is a bottleneck module, each bottleneck module is composed of three convolutional layers, three batch regularization layers and a relu activation layer, and a CNN skeleton is divided into four parts including 3, 4, 6 and 3 bottleneck modules respectively. Then a global pooling layer and two fully connected layers are connected. An output dimension of the last fully connected layer is 128.

S5, After a bag containing 2 m patches is obtained by processing the histopathology image to be processed in S1 and S3, the bag is classified by using the model B trained in S4. The classification result is the final classification result of the original image to be classified.

The model A and the model B are both trained by using a stochastic gradient descent method and an Adam optimizer, an initial learning rate is 0.00001, and a weight decay coefficient is 0.0001. In a process of training the model A, a value of the batch size is 32. In a process of training the model B, a value of the batch size is 1.

Figure 5:
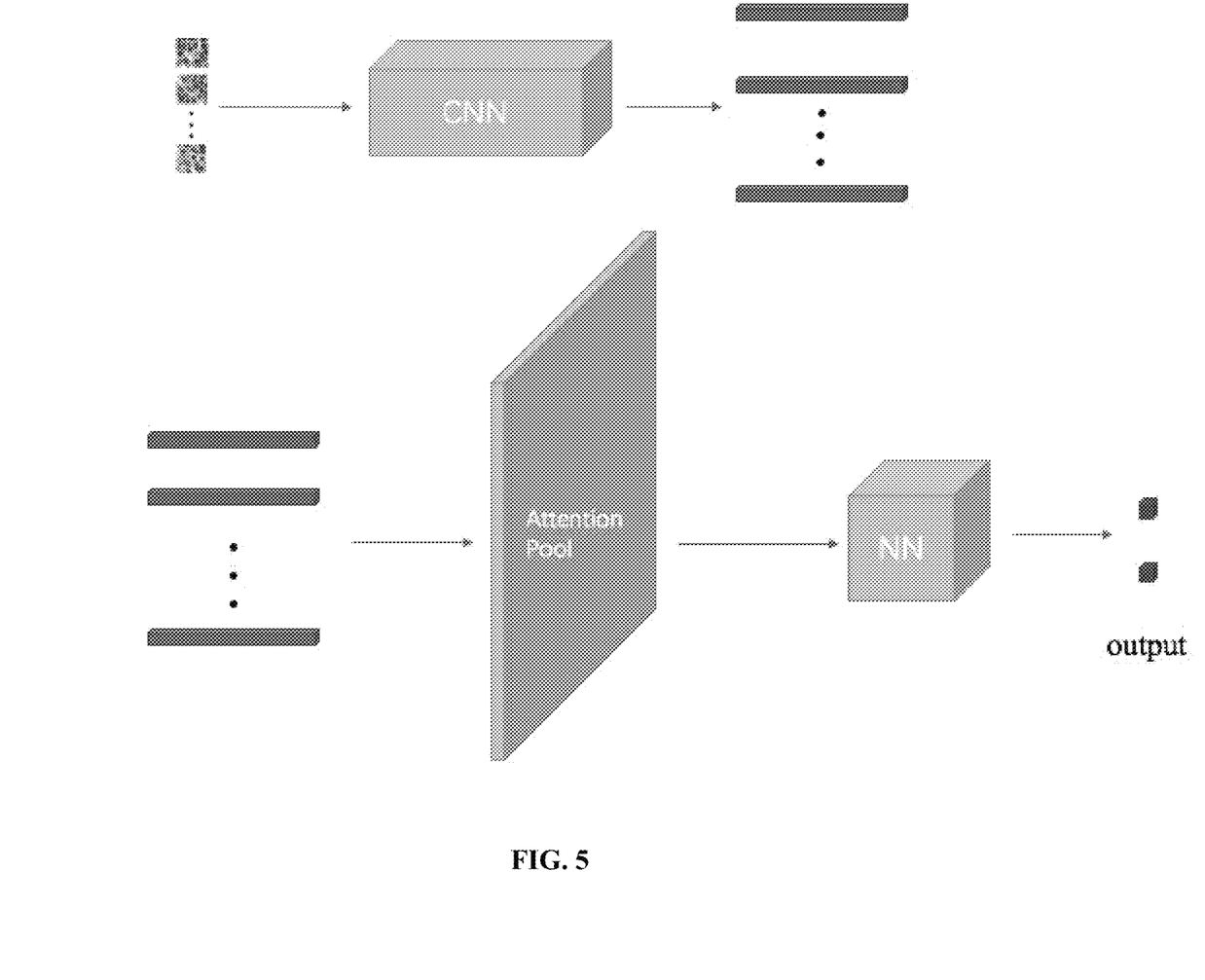
FIG. 5 is a working mechanism of an existing attention pooling-based method.
Figure 6:
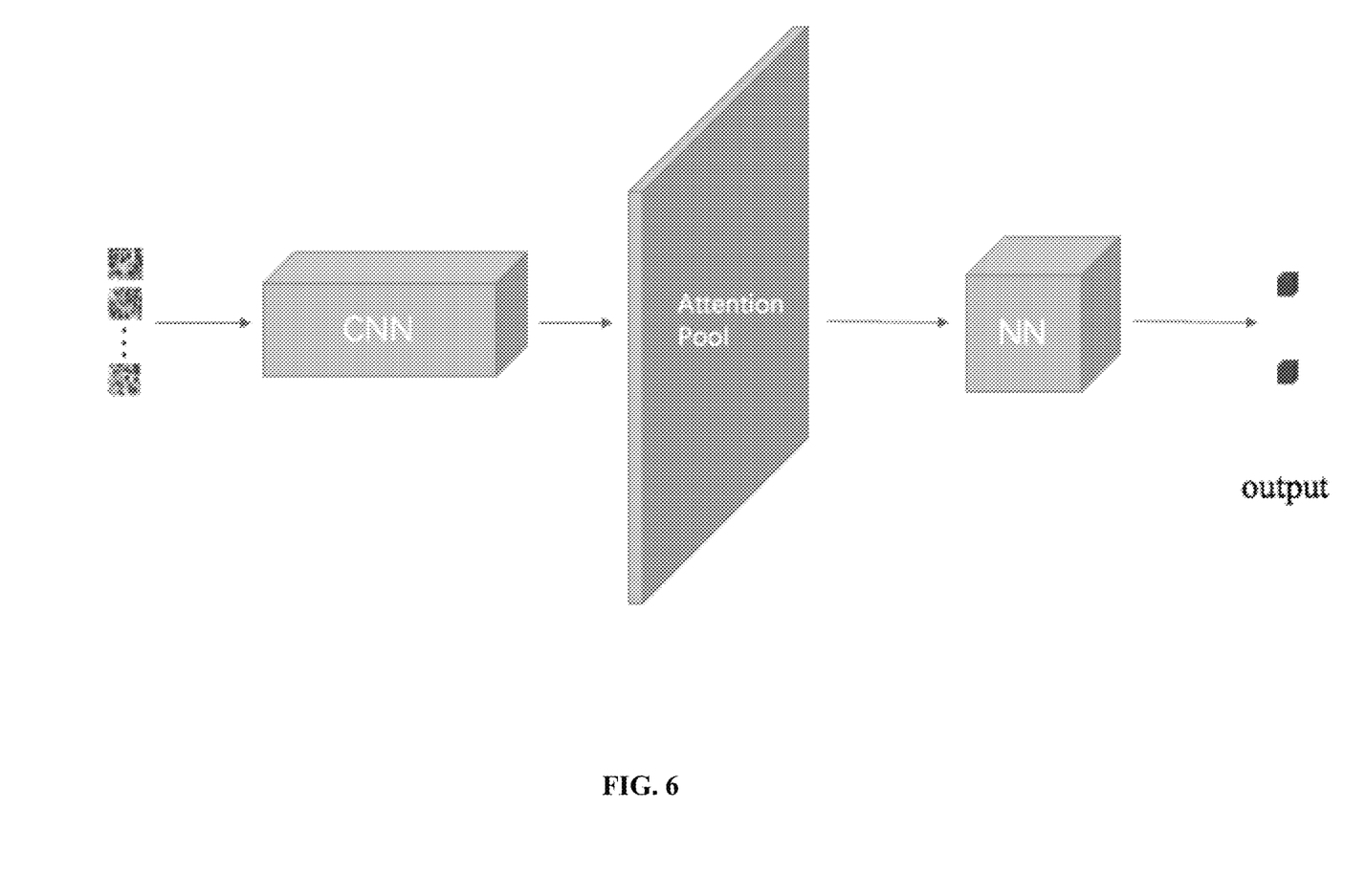
FIG. 6 is a working mechanism of an end-to-end attention pooling-based method provided by the present disclosure.

An automatic classification algorithm for histopathological whole slide images is still in a theoretical stage at present. Most of the current algorithms for histopathology diagnosis are based on maximum pooling or other pooling to build a two-stage model. Due to the lack of an effective feedback mechanism for the quality of feature extraction, the accuracy of these models is generally not high. In 2019, a classification index on a CAMELYON16 dataset used in the experiment was only 0.725. The present disclosure improves the original deep learning method, samples the patches with the scores given by the deep learning model, and then uses the end-to-end attention pooling-based network for classification, such that the diagnosis accuracy of the original method is effectively improved, and reaches 0.790 on the CAMELYON16 dataset used in the experiment. It can provide effective help for doctors.

The specific embodiments described herein are merely illustrative of the spirit of the present disclosure. A person skilled in the art can make various modifications or supplements to the specific embodiments described or replace them in a similar manner, but it may not depart from the spirit of the present disclosure or the scope defined by the appended claims.

What is claimed is:

1. An end-to-end attention pooling-based classification method for histopathology images, comprising the following steps:
   S1, cutting a histopathological whole slide image into square patches with a side length L, pre-processing to filter patches, and packaging the remaining patches into a bag;
   S2, modifying the last fully connected layer in a pre-trained Resnet50 network, recording the modified model as A, and training the model A by a standard multi-instance learning method;
   S3, scoring all the patches by using the trained model A, and selecting m patches with highest and lowest scores for each image to form a new bag;
   S4, building a deep learning model B comprising an attention pooling module, and training the model B by using the new bag obtained in S3; and
   S5, after a bag containing 2 m patches is obtained by processing the histopathology image to be classified in S1 and S3, classifying the bag by using the model B trained in S4, wherein the classification result is the final classification result of the image to be classified.

2. The end-to-end attention pooling-based classification method for histopathology images according to claim 1, wherein preprocessing to filter patches in S1 refers to removing the patches with the background area ratio exceeding a certain range, and is specifically implemented as follows:
   firstly, calculating a threshold of the background area and foreground area for a whole slide image at a low resolution by using an Otsu method, wherein a specific algorithm of the Otsu method is to find a threshold t to minimize a sum of variances within the foreground area and the background area, and a calculation formula is as follows:

$$\sigma^2(t) = w_0(t)\sigma_0^2(t) + w_1(t)\sigma_1^2(t),$$

$\sigma_0^2(t)$ refers to a variance of a gray value within the background area when t is taken as the threshold, and $\sigma_1^2(t)$ refers to a variance within the foreground area when t is taken as the threshold; and it is assumed that when t is taken as the threshold, a gray value of pixels belonging to the background area is recorded as B(i), a gray value of pixels belonging to the foreground area is recorded as F(i), a number of the pixels belonging to the foreground area is recorded as $N_F$, and a number of the pixels belonging to the background area is recorded as $N_B$, and calculation methods of the variances are as follows:

$$\sigma_0^2(t) = \frac{1}{N_B} \sum \left( B(i) - \frac{1}{N_B} \sum B(i) \right)^2, \text{ and}$$

$$\sigma_1^2(t) = \frac{1}{N_F} \sum \left( F(i) - \frac{1}{N_F} \sum F(i) \right)^2,$$

and
   $w_1(t)$ and $w_2(t)$ are proportions of the foreground area and the background area when t is taken as the threshold; and after an optimal threshold is obtained by using the above algorithm, a proportion of the background area in a whole patch area under the optimal threshold is calculated, and if the proportion exceeds a certain value, the patch is discarded.

3. The end-to-end attention pooling-based classification method for histopathology images according to claim 1, wherein in S2, an output dimension of the last fully connected layer of the Resnet50 network is modified to 128, and a fully connected layer with an input dimension of 128 and an output dimension of 2 is added after the fully connected layer of the last layer.

4. The end-to-end attention pooling-based classification method for histopathology images according to claim 1, wherein training the model A by the standard multi-instance learning method in S2 is as follows: an assumption of multi-instance learning is that at least one patch in a positive bag is positive, and all patches in a negative bag are negative; before each epoch of training, firstly all the patches are scored by using the model A, k patches with the highest score in each image are selected, and the selected patches are labeled the same as the whole slide image; and all the selected patch-label pairs constitute a dataset required for training, the model A is trained, and the above process is repeated until an accuracy of the model A on a validation set no longer improves.

5. The end-to-end attention pooling-based classification method for histopathology images according to claim 4, wherein training the model A until the accuracy of the model A on the validation set no longer improves is specifically implemented as follows:
   for each patch $x_i$ in the image, an output of the model A is $[o_{i1}, o_{i2}]$, and then $[p_{i1}, p_{i2}]$ is obtained by using a softmax function, wherein $$p_{i2} = \frac{e^{o_{i1}}}{e^{o_{i1}} + e^{o_{i2}}}.$$

outputs of all the patches are collected to obtain $[p_{12}, p_{22}, \ldots, p_{l2}]$, l is a number of the patches, a maximum value is recorded as $p_i$, and then a predicted value $y_p$ of the image is:

$$y_p = \begin{cases} 0 & p_i \leq 0.5 \\ 1 & p_i > 0.5 \end{cases},$$

and
   when the predicted value is 0, it means that the image is predicted to be negative, and when the predicted value is 1, it means that the image is predicted to be positive; and according to a prediction result, the classification accuracy of the model A is calculated, and if the accuracy of the model A on the validation set does not improve after a specified number of epoch, training is stopped and a model with the highest accuracy on the validation set is saved.

6. The end-to-end attention pooling-based classification method for histopathology images according to claim 1, wherein scoring the patches by using the trained model A in S3 is specifically as follows: for each patch, a two-dimensional output $[o_1, o_2]$ is obtained for the last fully connected layer of the model A, and the output is normalized by using a softmax function to obtain [$p_1$, $p_2$], wherein $$p_i = \frac{e^{o_i}}{\sum_{j=1}^{2} e^{o_j}},$$

and
then $p_2$ is recorded as the score of the model A on the patch.

7. The end-to-end attention pooling-based classification method for histopathology images according to claim 1, wherein the model B comprising the attention pooling module in S4 has a structure specifically as follows: a feature extraction module, followed by a fully connected layer with a tan h activation layer and a fully connected layer with a sigmoid activation layer, and a classification module;

the feature extraction module is used to extract a feature $h_i$ corresponding to each patch, then the two fully connected layers with different activation layers are used to calculate attention weights according to the feature, and a specific calculation process is as follows:

$$a_{ti} = \tanh(w^T h_i),$$

$$a_{si} = sigmoid(v^T h_i), \text{ and}$$

$$a_i = \frac{e^{a_{ti} \odot a_{si}}}{\sum_{j=1}^{2m} e^{a_{tj} \odot a_{sj}}},$$

w and v are parameters of the two fully connected layers, j has no actual meaning, and is an index used for summation, $a_i$ is the attention weight of an i-th feature $h_i$, and a weighted sum of the weights and the features is performed to obtain a feature representation of the image:

$$h = \sum_{i=1}^{2m} a_i h_i,$$

and
then the feature is classified by the classification module composed of two fully connected layers.

8. The end-to-end attention pooling-based classification method for histopathology images according to claim 7, wherein the feature extraction module uses a convolutional neural network (CNN), a basic unit of the CNN is a bottleneck module, each bottleneck module is composed of three convolutional layers, three batch regularization layers and a relu activation layer, and a CNN skeleton is divided into four parts comprising 3, 4, 6 and 3 bottleneck modules respectively; then a global pooling layer and two fully connected layers are connected; and an output dimension of the last fully connected layer is 128.

9. The end-to-end attention pooling-based classification method for histopathology images according to claim 1, wherein the model A and the model B are both trained by using a stochastic gradient descent method and an Adam optimizer, an initial learning rate is 0.00001, and a weight decay coefficient is 0.0001; and in a process of training the model A, a value of the batch size is 32, and in a process of training the model B, a value of the batch size is 1.

* * * * *